(12) United States Patent
Baba et al.

(10) Patent No.: US 8,598,603 B2
(45) Date of Patent: Dec. 3, 2013

(54) LIQUID CRYSTAL DISPLAY DEVICE AND TELEVISION SET

(75) Inventors: Masashi Baba, Chiba (JP); Ikuko Imajo, Mobara (JP); Isao Matsuda, Takatsuki (JP)

(73) Assignees: Hitachi Displays, Ltd., Chiba (JP); Panasonic Liquid Display Co., Ltd., Hyogo (JP)

( * ) Notice: Subject to any disclaimer, the term of this patent is extended or adjusted under 35 U.S.C. 154(b) by 0 days.

(21) Appl. No.: 13/170,258

(22) Filed: Jun. 28, 2011

(65) Prior Publication Data

US 2011/0316010 A1 Dec. 29, 2011

(30) Foreign Application Priority Data

Jun. 28, 2010 (JP) ................................. 2010-146547

(51) Int. Cl.
 *H01L 33/08* (2010.01)
(52) U.S. Cl.
 USPC ........................................... 257/88; 362/97.3
(58) Field of Classification Search
 USPC ..................................... 257/88, 89
 See application file for complete search history.

(56) References Cited

U.S. PATENT DOCUMENTS

| 7,488,104 | B2 * | 2/2009 | Hamada et al. ................ 362/616 |
| 7,671,832 | B2 * | 3/2010 | Lankhorst et al. ............ 345/102 |
| 7,744,233 | B2 | 6/2010 | Moriyasu et al. |
| 7,826,703 | B2 * | 11/2010 | Iwasaki ........................ 385/129 |
| 8,174,487 | B2 * | 5/2012 | Furukawa et al. ............. 345/102 |
| 8,210,732 | B2 * | 7/2012 | Okumura et al. ............. 362/628 |
| 2006/0002143 | A1 * | 1/2006 | Gu et al. ....................... 362/612 |
| 2008/0049164 | A1 * | 2/2008 | Jeon et al. ........................ 349/61 |
| 2008/0106205 | A1 * | 5/2008 | Wada et al. ..................... 315/89 |
| 2008/0316750 | A1 * | 12/2008 | Park .............................. 362/294 |
| 2009/0092366 | A1 * | 4/2009 | Iwasaki ........................ 385/129 |
| 2009/0168396 | A1 * | 7/2009 | Moriyasu et al. ............... 362/84 |
| 2009/0316072 | A1 * | 12/2009 | Okumura et al. ............... 349/64 |
| 2011/0050111 | A1 * | 3/2011 | Tanaka et al. ............. 315/185 R |
| 2011/0085351 | A1 * | 4/2011 | Pijlman et al. ................ 362/607 |
| 2011/0090142 | A1 * | 4/2011 | You et al. ....................... 345/102 |
| 2011/0122341 | A1 | 5/2011 | Hayashi |
| 2011/0187269 | A1 * | 8/2011 | Chang et al. .................. 315/113 |
| 2011/0211134 | A1 * | 9/2011 | Yoshikawa .................... 348/739 |
| 2011/0242845 | A1 * | 10/2011 | Hong et al. ................... 362/608 |
| 2011/0316014 | A1 * | 12/2011 | Hiroyuki ........................ 257/89 |
| 2012/0044669 | A1 * | 2/2012 | Ogata et al. ................. 362/97.3 |
| 2012/0139445 | A1 * | 6/2012 | Fujiwara et al. .............. 315/294 |
| 2012/0193619 | A1 * | 8/2012 | Taka et al. ....................... 257/40 |

FOREIGN PATENT DOCUMENTS

| JP | 08248420 A | * | 9/1996 |
| JP | 2009-087879 | | 4/2009 |
| WO | WO 2007/063799 | | 6/2007 |
| WO | WO 2010/013544 | | 2/2010 |

* cited by examiner

*Primary Examiner* — Julio J Maldonado
*Assistant Examiner* — Jaehwan Oh
(74) *Attorney, Agent, or Firm* — Antonelli, Terry, Stout & Kraus, LLP.

(57) ABSTRACT

Provided is a liquid crystal display device, including: a liquid crystal display panel; and a backlight unit, in which: the backlight unit includes: a plurality of light emitting diodes each having an anode and a cathode; a first substrate; and a second substrate, the plurality of light emitting diodes being mounted on the first substrate and the second substrate; the first substrate and the second substrate are disposed adjacent to each other; light emitting diodes which are adjacent across a boundary between the first substrate and the second substrate are disposed so that the respective anodes are opposed to each other and so as to have a pitch equal to or smaller than a pitch of other adjacent light emitting diodes.

5 Claims, 11 Drawing Sheets

LIQUID CRYSTAL DISPLAY DEVICE AND TELEVISION SET

CROSS-REFERENCE TO RELATED APPLICATION

The present application claims priority from Japanese application JP 2010-146547 filed on Jun. 28, 2010, the content of which is hereby incorporated by reference into this application.

BACKGROUND OF THE INVENTION

1. Field of the Invention

The present invention relates to a liquid crystal display device.

2. Description of the Related Art

Light emitting diodes (LEDs) have become widely used as light sources of a backlight unit. For example, there is known an edge light type backlight unit in which, instead of cold-cathode tubes, light emitting diodes are disposed on an end surface of a light guide plate so as to enable surface emission by the light guide plate. Further, there is known an example using light emitting diodes in a direct type backlight unit (Japanese Patent Application Laid-open No. 2009-87879).

In a conventional direct type or edge type backlight unit, the light emitting diodes are generally arranged evenly or at equal intervals. With this arrangement, heat generated from the light emitting diodes is uniform inside the backlight unit.

However, in recent years, even in the direct type backlight unit, there has been a demand that the light emitting diodes be disposed on a substrate which is much smaller in size compared with a liquid crystal panel. In such a case, the light emitting diodes are arranged at unequal pitches in some cases in view of the luminous efficiency. In such a case, heat generation inevitably increases at a portion where the light emitting diodes are provided close to one another. Therefore, some countermeasure against heat is required.

SUMMARY OF THE INVENTION

The present invention has an object to provide a liquid crystal display device provided with a countermeasure against heat in a backlight unit.

(1) A liquid crystal display device according to the present invention includes: a liquid crystal display panel; and a backlight unit, in which: the backlight unit includes: a plurality of light emitting diodes each having an anode and a cathode; a first substrate; and a second substrate, the plurality of light emitting diodes being mounted on the first substrate and the second substrate; the first substrate and the second substrate are disposed adjacent to each other; light emitting diodes, which are adjacent across a boundary between the first substrate and the second substrate, of the plurality of light emitting diodes are disposed so that the respective anodes are opposed to each other and so as to have a pitch equal to or smaller than a pitch of other adjacent light emitting diodes of the plurality of light emitting diodes. According to the present invention, a pair of the light emitting diodes having a small pitch are disposed so that respective anodes are opposed to each other. Therefore, the respective cathodes, at which heat is easily generated, are kept away from each other, and hence it is possible to avoid heat concentration.

(2) In the liquid crystal display device as described in Item (1) of the present invention: light emitting diodes, which are mounted on the first substrate, of the plurality of light emitting diodes may all be arranged so that the cathodes thereof face a side opposite to the second substrate; and light emitting diodes, which are mounted on the second substrate, of the plurality of light emitting diodes may all be arranged so that the cathodes thereof face a side opposite to the first substrate.

(3) In the liquid crystal display device as described in Item (2) of the present invention: the light emitting diodes mounted on the first substrate may be arranged in a direction separating from the second substrate and may be electrically connected in series; and the light emitting diodes mounted on the second substrate may be arranged in a direction separating from the first substrate and may be electrically connected in series.

(4) The liquid crystal display device as described in Item (3) of the present invention may further include: a first connector, which is mounted at an end portion of the first substrate on a side opposite to the second substrate; first cathode wiring, which electrically connects the first connector and the cathode of the light emitting diode which is farthest from the second substrate among the light emitting diodes electrically connected in series on the first substrate; first anode wiring, which electrically connects the first connector and the anode of the light emitting diode which is closest to the second substrate among the light emitting diodes electrically connected in series on the first substrate; a second connector, which is mounted at an end portion of the second substrate on a side opposite to the first substrate; second cathode wiring, which electrically connects the second connector and the cathode of the light emitting diode which is farthest from the first substrate among the light emitting diodes electrically connected in series on the second substrate; and second anode wiring, which electrically connects the second connector and the anode of the light emitting diode which is closest to the first substrate among the light emitting diodes electrically connected in series on the second substrate.

(5) In the liquid crystal display device as described in Item (4) of the present invention: the plurality of light emitting diodes may be respectively arranged on the first substrate and the second substrate in a plurality of rows; the first anode wiring may be disposed so as to pass between the plurality of light emitting diodes arranged in the plurality of rows on the first substrate; and the second anode wiring may be disposed so as to pass between the plurality of light emitting diodes arranged in the plurality of rows on the second substrate.

(6) In the liquid crystal display device as described in Item (4) of the present invention: the plurality of light emitting diodes may be respectively arranged on the first substrate and the second substrate in a plurality of rows; the first anode wiring may be disposed so as to pass one of regions opposing across all of the plurality of light emitting diodes arranged in the plurality of rows on the first substrate; and the second anode wiring may be disposed so as to pass one of regions opposing across all of the plurality of light emitting diodes arranged in the plurality of rows on the second substrate.

(7) In the liquid crystal display device as described in Item (4) of the present invention: the light emitting diodes mounted on the first substrate may be arranged in one row; and the light emitting diodes mounted on the second substrate may be arranged in one row.

(8) The liquid crystal display device as described in Item (3) of the present invention may further include: a connector, which is mounted at an end portion of the first substrate on a side opposite to the second substrate; anode wiring, which is formed on the first substrate and the second substrate so as to electrically connect the connector and the anode of the light emitting diode which is closest to the second substrate among the light emitting diodes electrically connected in series on the first substrate and so as to electrically connect the connector and the anode of the light emitting diode which is closest to the first substrate among the light emitting diodes electrically connected in series on the second substrate; first cathode wiring, which electrically connects the connector and the cathode of the light emitting diode which is farthest from the second substrate among the light emitting diodes electrically connected in series on the first substrate; and second cathode wiring, which is formed on the first substrate and the second substrate so as to electrically connect the connector and the cathode of the light emitting diode which is farthest from the first substrate among the light emitting diodes electrically connected in series on the second substrate.

(9) The liquid crystal display device as described in Item (8) of the present invention may further include a relay connector, which connects a part of the anode wiring on the first substrate and a part of the anode wiring on the second substrate and connects a part of the second cathode wiring on the first substrate and a part of the second cathode wiring on the second substrate.

(10) In the liquid crystal display device as described in Item (8) or (9) of the present invention: the plurality of light emitting diodes may be respectively arranged on the first substrate and the second substrate in a plurality of rows; and the anode wiring and the second cathode wiring may be disposed so as to pass one of regions opposing across all of the plurality of light emitting diodes arranged in the plurality of rows on the first substrate and the second substrate.

(11) In the liquid crystal display device as described in Item (8) or (9) of the present invention: the plurality of light emitting diodes may be respectively arranged on the first substrate and the second substrate in a plurality of rows; the anode wiring may be disposed so as to pass between the plurality of light emitting diodes arranged in the plurality of rows on the first substrate; and the second cathode wiring may be disposed so as to pass one of regions opposing across all of the plurality of light emitting diodes arranged in the plurality of rows on the first substrate and the second substrate.

(12) In the liquid crystal display device as described in any one of Items (1) to (11) of the present invention, the plurality of light emitting diodes may be arranged in a staggered pattern.

DETAILED DESCRIPTION OF THE INVENTION

Hereinafter, an embodiment mode of the present invention is described with reference to the drawings.

[Basic Structure]

Figure 1:
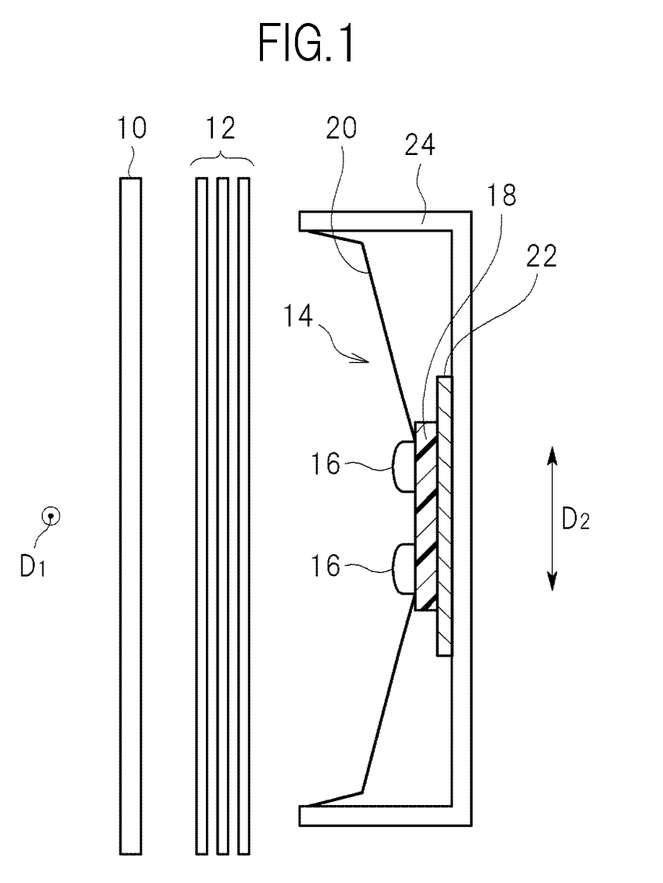
FIG. 1 is a cross-sectional view illustrating a basic structure of a liquid crystal display device according to an embodiment mode of the present invention.

FIG. 1 is a cross-sectional view illustrating a basic structure of a liquid crystal display device according to the embodiment mode of the present invention.

The liquid crystal display device includes a liquid crystal display panel 10. The liquid crystal display panel 10 has a display surface (left surface in FIG. 1) and a rear surface (right surface in FIG. 1), which is on a side opposite to the display surface. A plurality of optical sheets 12, such as a diffusion sheet and a prism sheet, are disposed so as to be opposed to the rear surface of the liquid crystal display panel 10.

Figure 2:
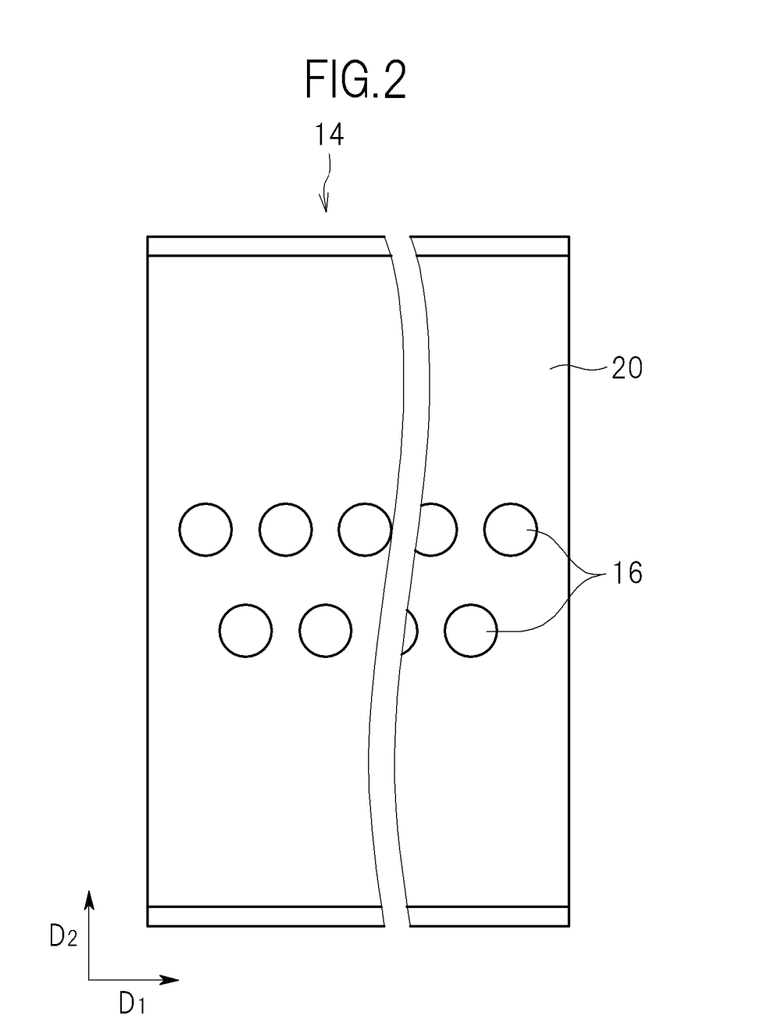
FIG. 2 is a plan view of a backlight unit.

The liquid crystal display device includes a backlight unit 14. FIG. 2 is a plan view of the backlight unit 14. The optical sheets 12 are disposed between the liquid crystal display panel 10 and the backlight unit 14. The backlight unit 14 includes a plurality of light emitting diodes 16 serving as light sources. The plurality of light emitting diodes 16 are mounted on a substrate 18 made of a glass epoxy resin or the like. The substrate 18 has a surface on which the plurality of light emitting diodes 16 are mounted, which is opposed to the rear surface (right surface in FIG. 1) of the liquid crystal display panel 10.

A reflection sheet 20 overlaps the substrate 18 at the surface on which the plurality of light emitting diodes 16 are mounted in a manner without overlapping the plurality of light emitting diodes 16. The reflection sheet 20 is larger in size than the substrate 18, and the entire substrate 18 is overlapped with a part of the reflection sheet 20. The reflection sheet 20 is made of, for example, a white polyethylene terephthalate (PET) resin. The reflection sheet 20 is made of a material having a rate of thermal expansion that is different from that of the material of the substrate 18. The reflection sheet 20 has higher light reflectance than the surface of the substrate 18. As illustrated in FIG. 1, the reflection sheet 20 is folded or bent so as to avoid being parallel to the rear surface (right surface in FIG. 1) of the liquid crystal display panel 10. In this manner, directions of light beams reflected by the reflection sheet 20 are adjusted.

The substrate 18 on which the light emitting diodes 16 are mounted is attached to a support plate 22. The support plate 22 is fixed to a bottom surface of a box-shaped housing 24 on an inner side thereof. The support plate 22 functions as a radiator plate. End portions of the reflection sheet 20 are attached to peripheral portions on the inner side of the housing 24.

The liquid crystal display panel 10 and the substrate 18 each have a shape in which a common width in a first direction $D_1$ (direction vertical to the sheet plane of FIG. 1 and right-and-left direction in FIG. 2) is longer than a width in a second direction $D_2$ (up-and-down direction in FIG. 1 or FIG. 2), which is orthogonal to the first direction $D_1$. For example, each of the liquid crystal display panel 10 and the substrate 18 has a rectangular shape which is long in the first direction $D_1$ in plan view.

As illustrated in FIG. 1, a width of the substrate 18 in the second direction $D_2$ is shorter than a width of the liquid crystal display panel 10 in the second direction $D_2$. The width of the substrate 18 in the second direction $D_2$ is one-third the width of the liquid crystal display panel 10 in the second direction $D_2$ or less. The substrate 18 is opposed to, while avoiding being opposed to both end portions of the liquid crystal display panel 10 in the second direction $D_2$, a central portion between the both end portions of the liquid crystal display panel 10.

Figure 3:
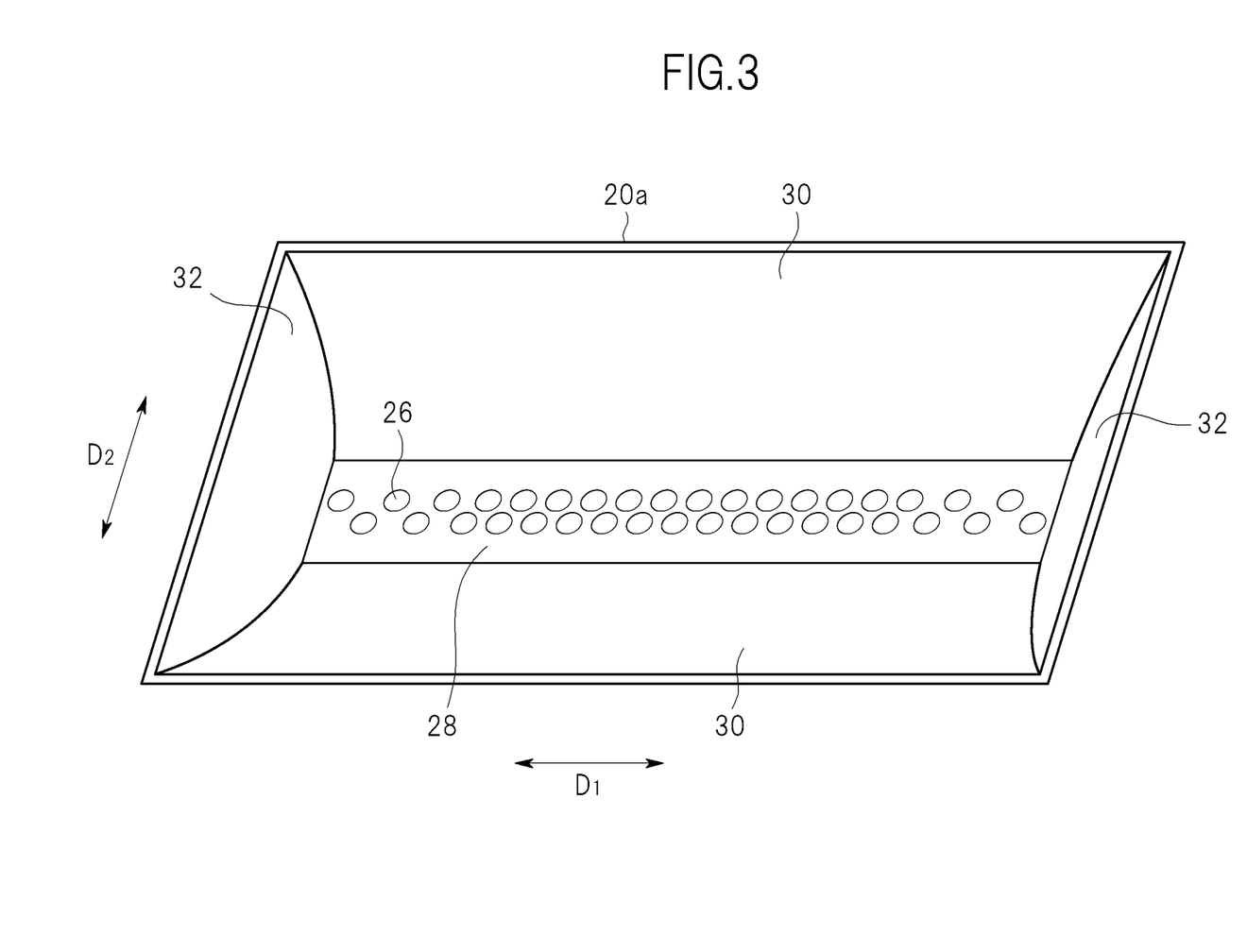
FIG. 3 is a view illustrating a reflection sheet, which corresponds to a structure in which light emitting diodes are arranged.

FIG. 3 is a view illustrating a reflection sheet 20a, which corresponds to the structure in which the light emitting diodes 16 are arranged. The reflection sheet 20a has a plurality of holes 26 formed therein so as to dispose the plurality of light emitting diodes 16 one by one on the inner side thereof. The plurality of holes 26 correspond to the arrangement of the light emitting diodes 16 illustrated in FIG. 2, and are arranged in a staggered pattern in the first direction $D_1$. The plurality of holes 26 are arranged at unequal pitches.

The reflection sheet 20a has a flat region 28, which is opposed and parallel to the substrate 18. The plurality of holes 26 are formed in the flat region 28. The reflection sheet 20a further has first inclined regions 30 provided continuously with the flat region 28 in an inclined manner. The first inclined regions 30 are respectively provided continuously with a pair of sides extending in the first direction $D_1$ of the flat region 28. The reflection sheet 20a is folded so that boundaries are observable between the flat region 28 and the first inclined regions 30. In each of the first inclined regions 30, a surface on a side opposite to the substrate 18 (surface on which light is reflected) is curved so as to become a recess surface.

The reflection sheet 20a further has second inclined regions 32 provided continuously with the flat region 28 in an inclined manner. The second inclined regions 32 are respectively provided continuously with a pair of sides extending in the second direction $D_2$ of the flat region 28. The reflection sheet 20a is folded so that boundaries are observable between the flat region 28 and the second inclined regions 32. One second inclined region 32 is positioned between a pair of the first inclined regions 30, and one first inclined region 30 is positioned between a pair of the second inclined regions 32.

Figure 4:
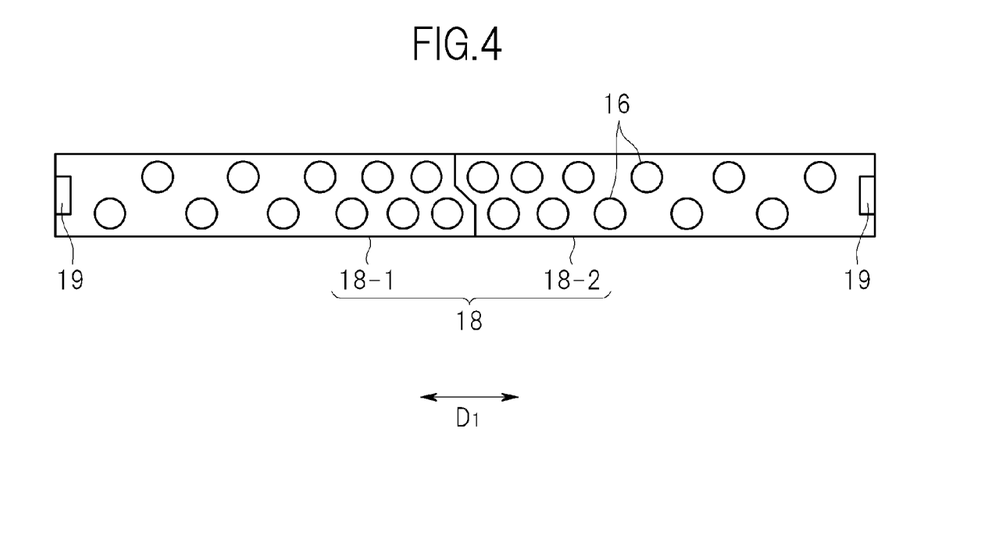
FIG. 4 is a top view of a substrate.

FIG. 4 is a top view of the substrate 18. The plurality of light emitting diodes 16 are arranged in two rows in the first direction $D_1$. The plurality of light emitting diodes 16 are arranged in a staggered pattern. Further, pitches between adjacent light emitting diodes 16 are unequal.

In this embodiment mode, the substrate 18 is divided into two substrates at a central portion thereof. In other words, the substrate 18 includes a first substrate 18-1 and a second substrate 18-2. This is because, in a liquid crystal television set or the like having a large screen, it is difficult to form the substrate 18 in an integrated manner. Division is made in order to facilitate the manufacturing steps. On the first substrate 18-1 or the second substrate 18-2, a connector 19 is mounted, to which wiring extended from an inverter circuit (not shown) for light source is connected. The first substrate 18-1 and the second substrate 18-2 are connected to each other, and the connector 19 is provided on each end portion of the connected first substrate 18-1 and second substrate 18-2. Further, the first substrate 18-1 and the second substrate 18-2 are formed in a point symmetric shape, and may be formed in the same shape.

Here, temperature characteristics of the light emitting diodes 16 are described. Each of the light emitting diodes 16 includes two terminals of an anode and a cathode. Generally, as for the temperature characteristics, the cathode side has a higher temperature. Although this is not a uniform characteristic and depends on a material and environment at the periphery, there is a case where one light emitting diode 16 has a temperature difference of few degrees between the anode and the cathode thereof.

In a case where the light emitting diodes 16 are uniformly arranged, there is little problem about the difference in heat generation temperature between the anode side and the cathode side. However, in a case where the light emitting diodes 16 are arranged at unequal pitches as in the example illustrated in FIG. 4, there are places where unequal heat generation occurs. Therefore, a countermeasure is required.

[First Embodiment]

Figure 5:
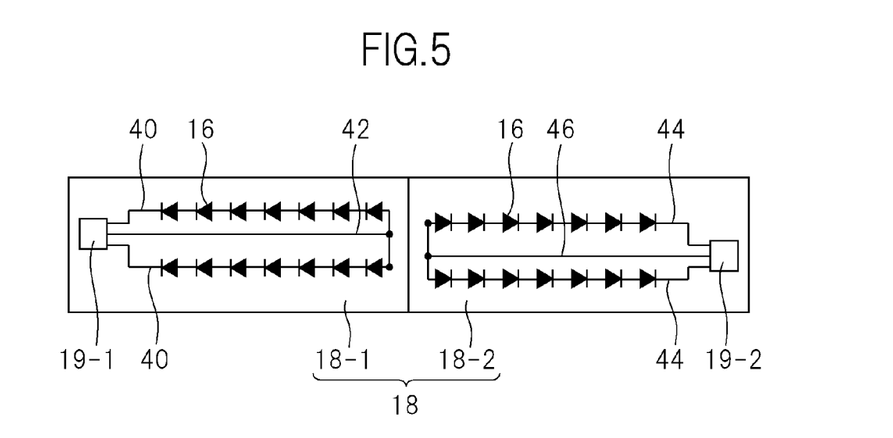
FIG. 5 is a wiring diagram of a first substrate and a second substrate of a liquid crystal display device according to a first embodiment of the present invention.

FIG. 5 is a wiring diagram of the first substrate 18-1 and the second substrate 18-2 of a liquid crystal display device according to a first embodiment of the present invention.

In this embodiment, the substrate 18 includes the first substrate 18-1 and the second substrate 18-2. The first substrate 18-1 and the second substrate 18-2 are disposed adjacent to each other. The plurality of light emitting diodes 16 are mounted on the first substrate 18-1 and the second substrate 18-2.

Note that, in FIG. 4, the light emitting diodes 16 are in a staggered arrangement and the arrangement intervals thereof are unequal pitches. However, in FIG. 5, in order to simplify the illustration, a case where the arrangement intervals thereof are equal pitches is illustrated. Further, a division part between the first substrate 18-1 and the second substrate 18-2 is illustrated to have a structure in which, for simplification, a division surface is provided in the vertical direction. Actually, the accurate arrangement intervals of the light emitting diodes 16 and substrate shape are as illustrated in FIG. 4.

Light emitting diodes 16 which are adjacent across a boundary between the first substrate 18-1 and the second substrate 18-2 are disposed so that respective anodes are opposed to each other. Further, actually, the light emitting diodes 16 which are adjacent across the boundary between the first substrate 18-1 and the second substrate 18-2 are arranged so as to have, as illustrated in FIG. 4, a pitch equal to or smaller than that of other adjacent light emitting diodes 16 on the same substrate.

The light emitting diodes 16 mounted on the first substrate 18-1 are all arranged so that the cathodes thereof face a side opposite to the second substrate 18-2. On the first substrate 18-1, the light emitting diodes 16 are arranged in a direction separating from the second substrate 18-2 and are electrically connected in series.

The light emitting diodes 16 mounted on the second substrate 18-2 are all arranged so that the cathodes thereof face a side opposite to the first substrate 18-1. On the second substrate 18-2, the light emitting diodes 16 are arranged in a direction separating from the first substrate 18-1 and are electrically connected in series.

According to this embodiment, a pair of light emitting diodes 16 having the smallest pitch (that is, the light emitting diodes 16 which are adjacent across the boundary between the first substrate 18-1 and the second substrate 18-2 (see FIG. 4)) are disposed so that respective anodes are opposed to each other. Therefore, the respective cathodes, at which heat is easily generated, are kept away from each other, and hence it is possible to avoid heat concentration. The above description corresponds to other embodiments similarly.

In this embodiment, all of the light emitting diodes 16 on the substrate 18-1 are formed so that the anode sides thereof face the substrate 18-2. This can also be applied to the substrate 18-2.

That is, the substrate 18-1 and the substrate 18-2 are formed so that the respective anode sides face each other. This is because, as illustrated in FIG. 4, the light emitting diodes 16 are arranged very close to one another around the bonding portion of the substrate 18-1 and the substrate 18-2, and hence heat is concentrated at that place.

According to this embodiment, in a part having the greatest concentration of heat, a region is provided where the respective anode sides of the adjacent light emitting diodes 16 are opposed to each other. In this manner, it is possible to form a region which alleviates heat.

A first connector 19-1 is mounted on the first substrate 18-1. The first connector 19-1 is mounted at an end portion of the first substrate 18-1 on a side opposite to the second substrate 18-2.

First cathode wiring 40 is formed on the first substrate 18-1. The first cathode wiring 40 electrically connects the first connector 19-1 and the cathode of the light emitting diode 16 which is farthest from the second substrate 18-2 among the light emitting diodes 16 electrically connected in series on the first substrate 18-1.

First anode wiring 42 is formed on the first substrate 18-1. The first anode wiring 42 electrically connects the first connector 19-1 and the anode of the light emitting diode 16 which is closest to the second substrate 18-2 among the light emitting diodes 16 electrically connected in series on the first substrate 18-1.

A second connector 19-2 is mounted on the second substrate 18-2. The second connector 19-2 is mounted at an end portion of the second substrate 18-2 on a side opposite to the first substrate 18-1.

Second cathode wiring 44 is formed on the second substrate 18-2. The second cathode wiring 44 electrically connects the second connector 19-2 and the cathode of the light emitting diode 16 which is farthest from the first substrate 18-1 among the light emitting diodes 16 electrically connected in series on the second substrate 18-2.

Second anode wiring 46 is formed on the second substrate 18-2. The second anode wiring 46 electrically connects the second connector 19-2 and the anode of the light emitting diode 16 which is closest to the first substrate 18-1 among the light emitting diodes 16 electrically connected in series on the second substrate 18-2.

The plurality of light emitting diodes 16 are respectively arranged on the first substrate 18-1 and the second substrate 18-2 in a plurality of rows. The first anode wiring 42 is disposed so as to pass between the light emitting diodes 16 arranged in the plurality of rows on the first substrate 18-1. The second anode wiring 46 is disposed so as to pass between the light emitting diodes 16 arranged in the plurality of rows on the second substrate 18-2.

[Modified Example of First Embodiment]

Figure 6:
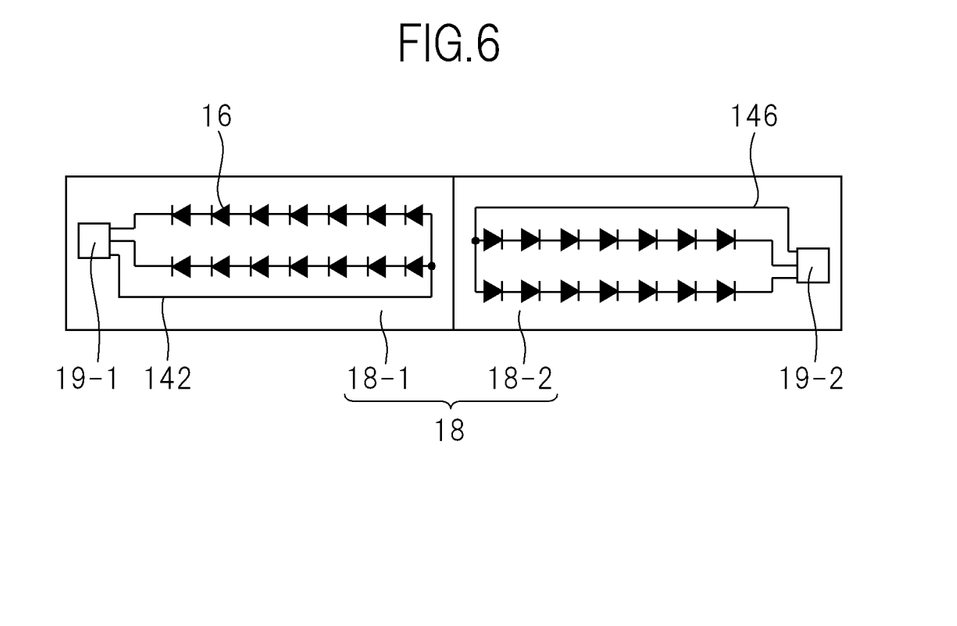
FIG. 6 is a wiring diagram of a first substrate and a second substrate of a liquid crystal display device according to a modified example of the first embodiment of the present invention.

FIG. 6 is a wiring diagram of the first substrate 18-1 and the second substrate 18-2 of a liquid crystal display device according to a modified example of the first embodiment of the present invention.

In this modified example, first anode wiring 142 and second anode wiring 146 are each wired on an outer side of the light emitting diodes 16 connected in series in two rows. Specifically, the plurality of light emitting diodes 16 are respectively arranged on the first substrate 18-1 and the second substrate 18-2 in a plurality of rows. The first anode wiring 142 is disposed so as to pass one of regions opposing across all of the light emitting diodes 16 arranged in the plurality of rows on the first substrate 18-1. The second anode wiring 146 is disposed so as to pass one of regions opposing across all of the light emitting diodes 16 arranged in the plurality of rows on the second substrate 18-2. The first anode wiring 142 and the second anode wiring 146 are respectively disposed at end portions of the substrate 18 on opposite sides. Other contents correspond to the contents described in the above-mentioned first embodiment.

[Second Embodiment]

Figure 7:
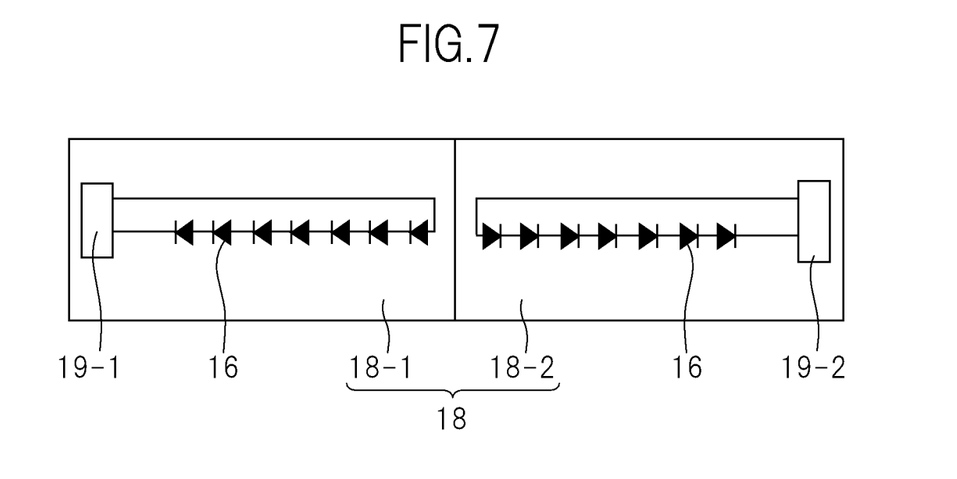
FIG. 7 is a wiring diagram of a first substrate and a second substrate of a liquid crystal display device according to a second embodiment of the present invention.

FIG. 7 is a wiring diagram of the first substrate 18-1 and the second substrate 18-2 of a liquid crystal display device according to a second embodiment of the present invention.

In this embodiment, the light emitting diodes 16 on the first substrate 18-1 are arranged in one row. The light emitting diodes 16 on the second substrate 18-2 are also arranged in one row. Other contents correspond to the contents described in the above-mentioned first embodiment.

[Third Embodiment]

Figure 8:
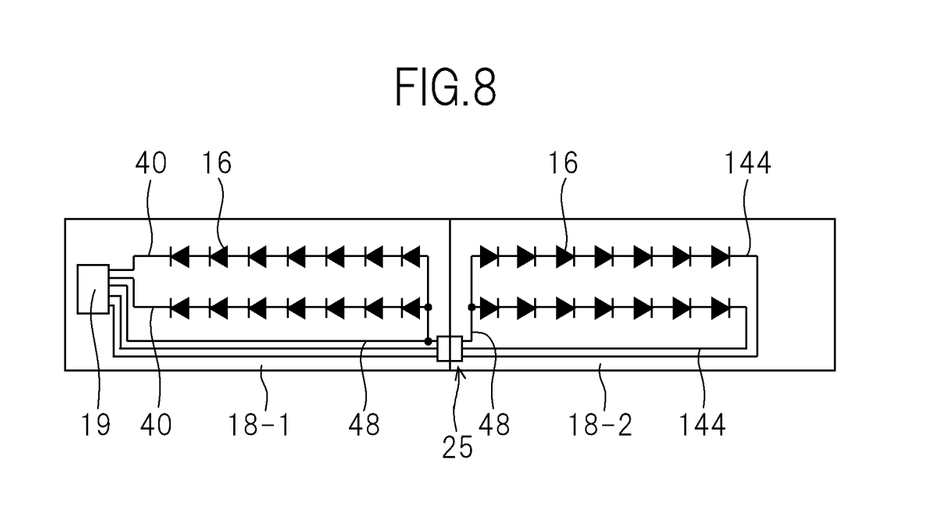
FIG. 8 is a wiring diagram of a first substrate and a second substrate of a liquid crystal display device according to a third embodiment of the present invention.

FIG. 8 is a wiring diagram of the first substrate 18-1 and the second substrate 18-2 of a liquid crystal display device according to a third embodiment of the present invention.

A connector 19 is mounted on the first substrate 18-1. The connector 19 is mounted at an end portion of the first substrate 18-1 on a side opposite to the second substrate 18-2. Meanwhile, a connector is not mounted on the second substrate 18-2. That is, electrical connection with the inverter (not shown) is achieved through the connector 19 of the first substrate 18-1 with respect to both of the first substrate 18-1 and the second substrate 18-2.

In this embodiment, anode wiring 48 is formed on the first substrate 18-1 and the second substrate 18-2. The anode wiring 48 electrically connects the connector 19 and the anode of the light emitting diode 16 which is closest to the second substrate 18-2 among the light emitting diodes 16 electrically connected in series on the first substrate 18-1. Further, the anode wiring 48 electrically connects the connector 19 and the anode of the light emitting diode 16 which is closest to the first substrate 18-1 among the light emitting diodes 16 electrically connected in series on the second substrate 18-2. A part of the anode wiring 48 on the first substrate 18-1 and apart of the anode wiring 48 on the second substrate 18-2 are connected by a relay connector 25.

The first cathode wiring 40 is formed on the first substrate 18-1. The first cathode wiring 40 electrically connects the connector 19 and the cathode of the light emitting diode 16 which is farthest from the second substrate 18-2 among the light emitting diodes 16 electrically connected in series on the first substrate 18-1.

Second cathode wiring 144 is formed on the first substrate 18-1 and the second substrate 18-2. The second cathode wiring 144 electrically connects the connector 19 and the cathode of the light emitting diode 16 which is farthest from the first substrate 18-1 among the light emitting diodes 16 electrically connected in series on the second substrate 18-2. A part of the second cathode wiring 144 on the first substrate 18-1 and a part of the second cathode wiring 144 on the second substrate 18-2 are connected by the relay connector 25.

The plurality of light emitting diodes 16 are respectively arranged on the first substrate 18-1 and the second substrate 18-2 in a plurality of rows.

The anode wiring 48 and the second cathode wiring 144 are disposed so as to pass one of regions opposing across all of the light emitting diodes 16 arranged in the plurality of rows on the first substrate 18-1 and the second substrate 18-2. The anode wiring 48 and the second cathode wiring 144 are arranged in parallel on the first substrate 18-1.

[Modified Example of Third Embodiment]

Figure 9:
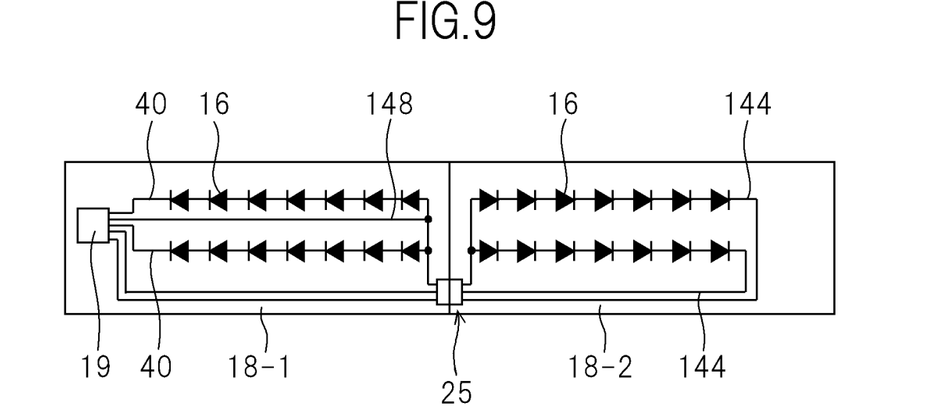
FIG. 9 is a wiring diagram of a first substrate and a second substrate of a liquid crystal display device according to a modified example of the third embodiment of the present invention.

FIG. 9 is a wiring diagram of the first substrate 18-1 and the second substrate 18-2 of a liquid crystal display device according to a modified example of the third embodiment of the present invention.

In this modified example, anode wiring 148 is disposed so as to pass between the light emitting diodes 16 arranged in the plurality of rows on the first substrate 18-1, which is different from the above-mentioned third embodiment. Other contents correspond to the contents described in the above-mentioned third embodiment. For example, also in this modified example, the plurality of light emitting diodes 16 are respectively arranged on the first substrate 18-1 and the second substrate 18-2 in a plurality of rows. Further, the second cathode wiring 144 is disposed so as to pass one of regions opposing across all of the light emitting diodes 16 arranged in the plurality of rows on the first substrate 18-1 and the second substrate 18-2.

By incorporating the liquid crystal display device described in any one of the embodiments described above, a television set can be formed, which receives radio waves for television broadcast to display images and output sound. Hereinafter, a liquid crystal television set is described as an example.

[Fourth Embodiment]

Figure 10:
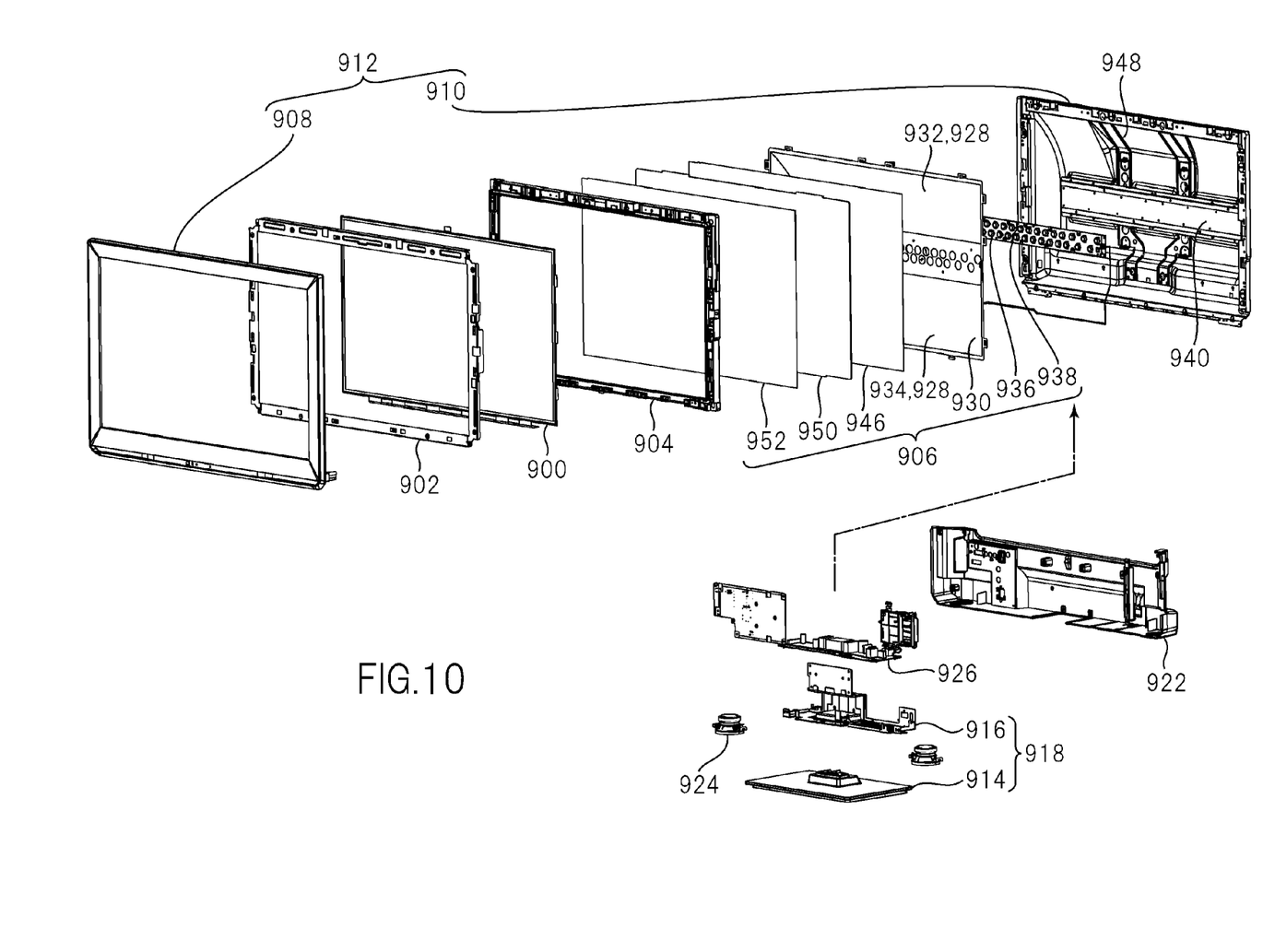
FIG. 10 is an exploded perspective view of a liquid crystal television set according to a fourth embodiment of the present invention.
Figure 11:
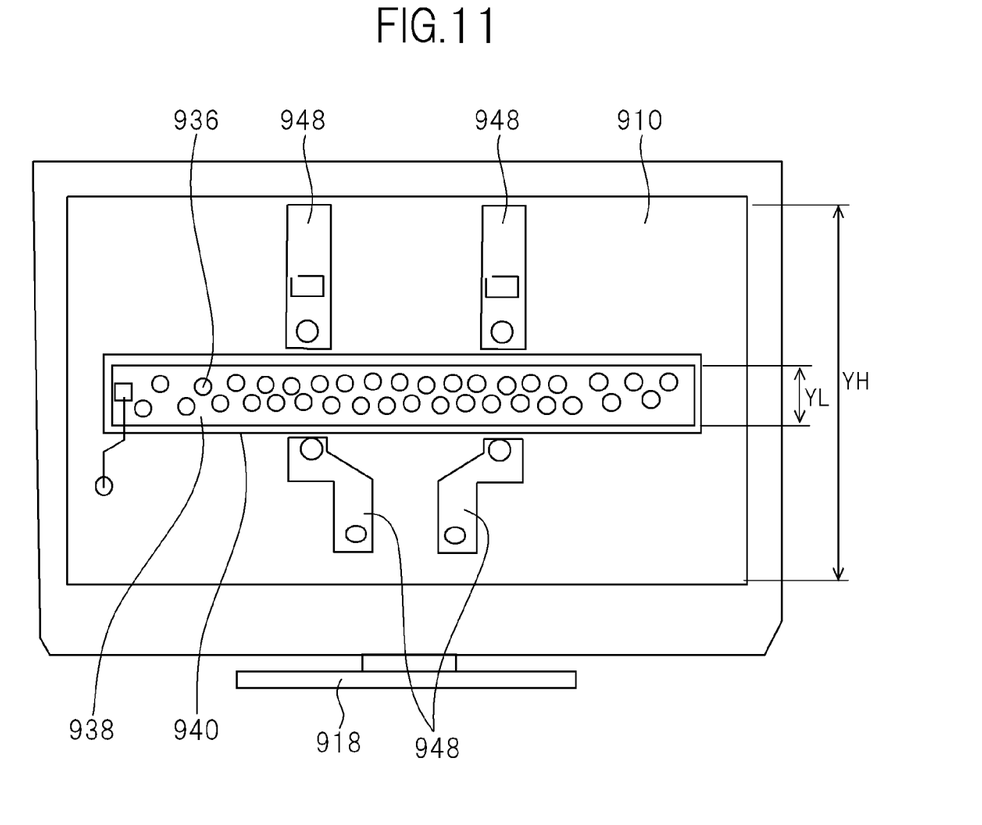
FIG. 11 is a view illustrating members provided behind a reflection sheet of the liquid crystal television set illustrated in FIG. 10.
Figure 12:
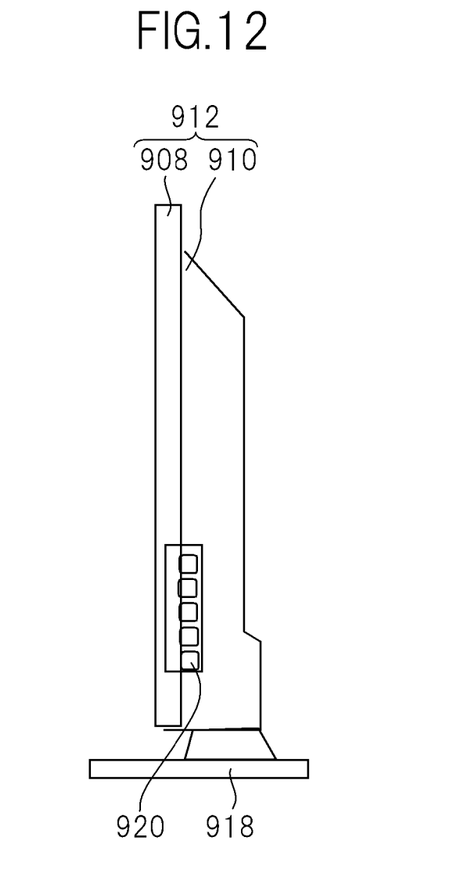
FIG. 12 is a side view of the liquid crystal television set illustrated in FIG. 10.
Figure 13:
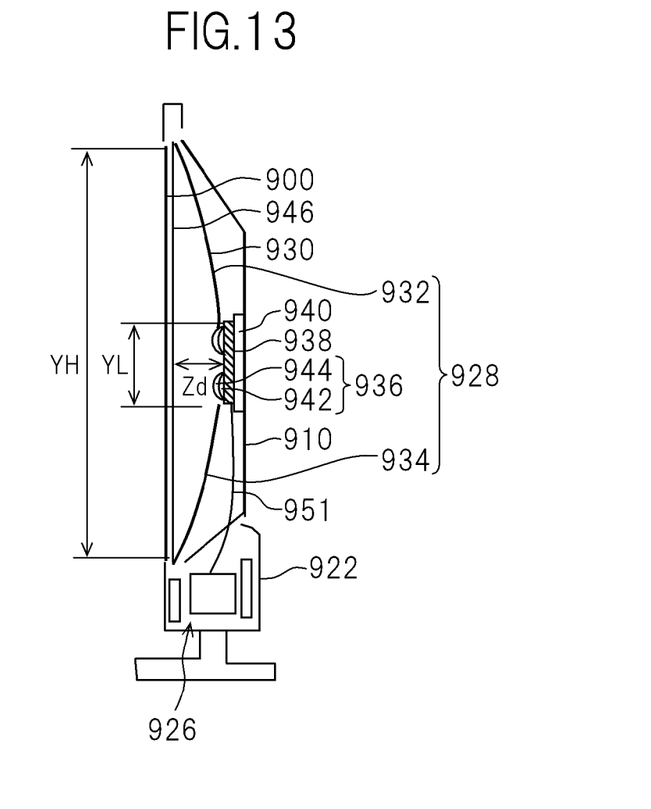
FIG. 13 is a schematic view of a vertical cross section of the liquid crystal television set illustrated in FIG. 10.

FIG. 10 is an exploded perspective view of a liquid crystal television set according to a fourth embodiment of the present invention. FIG. 11 is a view illustrating members provided behind a reflection sheet of the liquid crystal television set illustrated in FIG. 10. FIG. 12 is a side view of the liquid crystal television set illustrated in FIG. 10. FIG. 13 is a schematic view of a vertical cross section of the liquid crystal television set illustrated in FIG. 10.

The liquid crystal television set includes a liquid crystal display panel 900 having a horizontally long screen. The screen of the liquid crystal television set has an aspect ratio (ratio of horizontal dimension to vertical dimension) of 16:9. The liquid crystal display panel 900 has a front side (side on which an image is displayed) supported by an upper frame 902, and a rear side supported by a mold frame 904. The liquid crystal television set includes a backlight unit 906, which is overlapped by the liquid crystal display panel 900.

The liquid crystal display panel 900, the upper frame 902, the mold frame 904, and the backlight unit 906 are stored in a cabinet 912 including a front cabinet 908 and a back cabinet 910. The front cabinet 908 is made of a resin, and the back cabinet 910 is made of iron subjected to coating. The cabinet 912 is supported by a stand 918 including a pedestal 914 and a leg 916. As illustrated in FIG. 12, on the side surface of the cabinet 912, switches 920 are provided.

A cover 922 is attached to a lower rear part of the back cabinet 910. A speaker 924 and a circuit board 926 are disposed inside the cover 922. The circuit board 926 includes a tuned circuit (tuner) for selecting a radio wave having a specific frequency from radio waves having various frequencies.

The backlight unit 906 includes a reflection sheet 930 having a curved portion 928 so that a recess surface thereof faces the liquid crystal display panel 900. The curved portion 928 of the reflection sheet 930 is disposed so as to be separated from the cabinet 912 (see FIG. 13). The curved portion 928 includes a first curved portion 932 and a second curved portion 934. The first curved portion 932 and the second curved portion 934 are formed on respective sides of the reflection sheet 930 in a vertical direction of the screen while sandwiching a plurality of point light sources 936. The circuit board 926 is disposed on a lower side of a space between the curved portion 928 and the back cabinet 910 (see FIG. 13).

The backlight unit 906 includes a substrate 938 on which the reflection sheet 930 is overlapped on a side opposite to the liquid crystal display panel 900 of the reflection sheet 930. A width of the substrate 938 in the vertical direction of the screen is half the length of the screen in the vertical direction or less. The substrate 938 is fixed to the cabinet 912. The substrate 938 may be directly fixed to the cabinet 912, or may be fixed to the cabinet 912 through intermediation of a radiator plate 940. In the latter case, the substrate 938 is fixed to the radiator plate 940, and the radiator plate 940 is fixed to the cabinet 912.

In this embodiment, at a position roughly corresponding to a center of the screen, the point light sources 936 including light emitting diodes 942 (see FIG. 13) are mounted on the rectangular substrate 938, which is long in the horizontal direction. A printed-wiring board may be used as the substrate 938. Fixation of the substrate 938 is performed by threadably mounting the substrate 938 on the back cabinet 910, or threadably mounting the substrate 938 on the radiator plate 940 made of a metal such as aluminum and then fixing the radiator plate 940 to the back cabinet 910. The light emitting diodes 942 are arranged in a staggered pattern and in two rows in the up-and-down direction, so as to extend in the horizontal direction. When seen from the front side, a dimension YL of the substrate 938 is set so as to be one-third a height YH of the screen of the liquid crystal display panel 900 or less.

The backlight unit 906 includes the plurality of point light sources 936, which are mounted on the substrate 938 and disposed so as to protrude to the recess surface side of the curved portion 928 while passing through the reflection sheet 930. The plurality of point light sources 936 are arranged in at least one row in the horizontal direction of the screen, and arranged so as to be stored within a space region, which has a width in the vertical direction of the screen, the width being half the length of the screen in the vertical direction or less. Each of the point light sources 936 includes, as illustrated in FIG. 13, the light emitting diode 942 and a lens 944 disposed on the outer side thereof. On the substrate 938, the lenses 944 each made using an acrylic resin are mounted so as to respectively cover the light emitting diodes 942.

Figure 14:
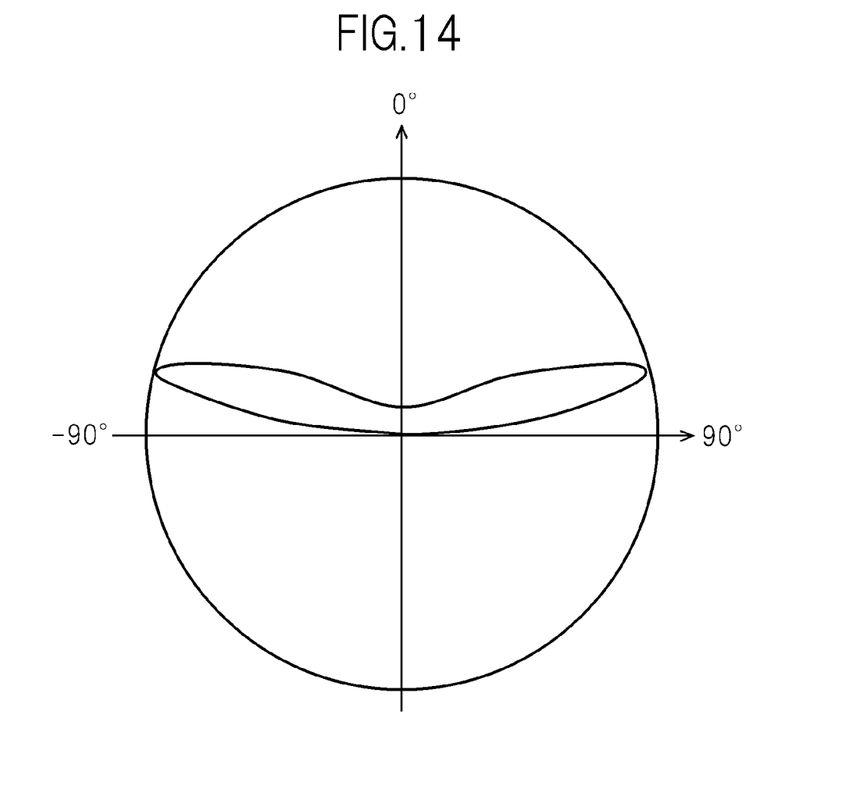
FIG. 14 illustrates a light intensity distribution of a point light source.
Figure 15:
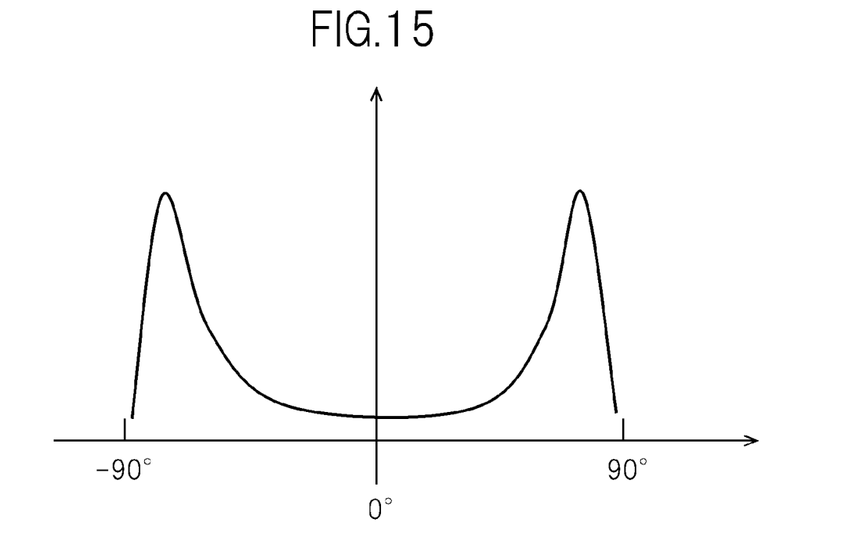
FIG. 15 is a graph illustrating a measurement result of intensity of light which exits from a lens.

The point light source 936 emits light in a perpendicular direction to the substrate 938 and in other directions, and light emitted in the other directions is higher in intensity than light emitted in the perpendicular direction. The lens 944 has a wide light distribution characteristic, which causes the light emitted from the light emitting diode 942 to be more spread out in a viewing angle direction than in a front side direction. Such a light intensity distribution (directivity characteristic) of the point light source 936 is illustrated in FIG. 14. Further, FIG. 15 is a graph illustrating a measurement result of intensity of light which exits from the lens 944. Note that, angle values represent angles formed between a normal to the substrate 938 and a light emission direction.

One of the features of the liquid crystal television set is high image quality performance, which provides an impression that, although the vertical direction dimension YL of the substrate 938 is reduced to be one-third the screen dimension YH or less along the vertical direction of the screen, the screen is bright and high brightness uniformity is provided across the entire screen.

In the conventional liquid crystal television set, a plurality of substrates each including a plurality of light emitting diodes are provided so as to obtain uniform brightness or smooth brightness change even in a region between the substrates. Specifically, many light emitting diodes are used to shorten intervals between the light emitting diodes and hence obtain smooth brightness change, and the substrates are disposed so that each position of the individual light emitting diodes cannot be optically recognized. Further, there is a case where wide intervals are provided between the plurality of substrates by disposing lenses for wide light distribution above the light emitting diodes, but even in this case, the dimension of the substrates is larger than one-third the screen.

In this embodiment, a dimension between outer surfaces of a pair of lenses 944 which are most separated in the vertical direction, the outer surfaces facing directions opposite to each other, is one-third the screen dimension YH or less. When the light emitting diodes 942 are arranged in a row in the horizontal direction, a width (diameter) of the lens 944 in the vertical direction is one-third the screen dimension YH or less. In order to reduce cost, the light emitting diode 942 and the lens 944 are formed in dimensions not to extend off the substrate 938, and the dimensions thereof are set to the minimum.

In this embodiment, the vertical dimension YL of the substrate 938, or the dimension between outer sides of the lenses 944 arranged in two rows in the vertical direction, is one-third the vertical dimension of the screen or less. Therefore, even if the number of the light emitting diodes 942 is reduced, the screen is bright and a natural and smooth brightness distribution is obtained. Therefore, the cost may be greatly reduced.

In this embodiment, the curved portion 928 of the reflection sheet 930 is formed so as to have a width of a length obtained by subtracting the vertical dimension YL of the substrate 938 from the dimension YH in the vertical direction of the screen (short side direction of the screen). When the width of the curved portion 928 is half the dimension YH or more, the brightness distribution of the screen is comfortable even when the screen is seen from the front side. Further, the number of the light emitting diodes 942 may be significantly reduced, and hence the cost may be reduced. That is, the cost may be reduced by forming a region for reflection by the curved portion 928 to be larger than a region for a space where the point light sources 936 are stored.

The light emitted from the light emitting diode 942 disposed on the substrate 938 is spread out by the lens 944, which is made of an acrylic resin and disposed above the light emitting diode 942. The light thus spread out has a distribution characteristic that light intensity is larger in an oblique direction than in the front side direction. The lens 944 for wide light distribution is attached to each of the plurality of light emitting diodes 942, and hence, in a space in a range from the substrate 938 to a diffusion plate 946 provided in the perpendicular direction (direction to the screen) (hereinafter, referred to as inner thickness Zd), the light radiated to a peripheral direction of the screen from the substrate 938 has higher light intensity than that of the light emitted to the front side. A part of the light which exits from the lens 944 to the front side passes through the diffusion plate 946, and then is used to display an image by the liquid crystal display panel 900. The rest of the light is reflected by the diffusion plate 946, and then reflected by the reflection sheet 930, to thereby be radiated to a direction different from the front side direction. A part of light radiated to a periphery of the screen after passing through the lens 944 passes through a peripheral portion of the screen by the diffusion plate 946, and other part of the light is reflected by the reflection sheet 930 having the curved portion 928 and passes through the diffusion plate 946 again.

As for the brightness performance of the liquid crystal television set having the above-mentioned structure, when the brightness measured from the front side is 100%, the periphery thereof is in a dark state of about 30%. A ratio of the brightness at the center of the screen in the front side to the average brightness is 1.65. However, because the curved portion 928 of the reflection sheet 930 is smoothly curved, smooth brightness change is obtained from the substrate 938 in the vertical direction of the screen. Therefore, even though the ratio of the central brightness to the average brightness is as large as 1.65, it is possible to provide a comfortable image because a large inflection point is absent in the distribution thereof.

The fact that a comfortable and smooth brightness distribution can be obtained even though the ratio of the central brightness to the average brightness is 1.65 or larger represents that, conversely, it is possible to reduce the number of the light emitting diodes 942 and narrow the width of the substrate 938, to thereby reduce the cost.

Note that, it is impossible to achieve the characteristic that the brightness at the center is high and the brightness decreases with smooth brightness distribution toward the periphery of the screen when a structure which blocks light radiation to the front side is provided. In this case, the center is dark, which results in uncomfortable display distribution. Therefore, the light emission characteristic of each point light source 936, which includes the light emitting diode 942 and the lens 944 near the corresponding light emitting diode 942, includes a predetermined output to the front side.

The back cabinet 910 forms the outermost surface of the liquid crystal television set. The substrate 938 is threadably mounted on the radiator plate 940. By dissipating the heat from the light emitting diodes 942 by the substrate 938 and the radiator plate 940, the junction temperature of the light emitting diode 942 is suppressed to a predetermined value. In a case where the specification brightness of the liquid crystal television set is low, the radiator plate 940 may be omitted. In this case, the substrate 938 is directly fixed to the back cabinet 910. In this case, heat dissipation of the light emitting diode 942 is performed only by the substrate 938, but even with the heat dissipation effect of the substrate 938, the junction temperature of the light emitting diode 942 may be suppressed to a predetermined value.

The substrate 938 and the reflection sheet 930 are fixed at positions near the back cabinet 910, and hence it is possible to achieve a thin liquid crystal television set. With this structure, the thickness of the liquid crystal television set may be reduced while maintaining the comfortable uniformity of the brightness performance.

In the conventional backlight unit structure, the substrate on which the light emitting diodes are mounted is fixed to a back frame (not shown) of the liquid crystal display device, which is made of iron or aluminum. On the outer portion of the back frame, there are disposed a power supply for driving the light emitting diodes and a substrate of a timing controller for controlling a gate signal line and a drain signal line of the liquid crystal display panel. The back cabinet is disposed on a further outer portion thereof. Therefore, the television set requires, in addition to the inner thickness distance between the diffusion plate and the light emitting diode of the backlight unit, a distance provided between the back frame and the back cabinet, which causes the liquid crystal television set to be thick.

In this embodiment, light, which exits from the lens 944 with a higher brightness in the periphery than in the front side, passes through the predetermined space (inner thickness Zd), and then passes through the diffusion plate 946 and the liquid crystal display panel 900. With this, an image is displayed. The substrate 938 is brought into contact with the radiator plate 940, and the radiator plate 940 and the back cabinet 910 are fixed to each other by a screw, and hence a space distance other than the inner thickness Zd is unnecessary. Therefore, the thickness of the liquid crystal television set may be reduced.

The reduction in thickness of the liquid crystal television set is achieved also by the disposition of the circuit board 926 including a power supply circuit, a video circuit, a tuned circuit (tuner), and a timing circuit for the liquid crystal display panel 900. Specifically, the curved portion 928 of the reflection sheet 930 is curved in a direction separating from the back cabinet 910, and hence a large space can be obtained between the curved portion 928 and the back cabinet 910. In the lower portion of the liquid crystal television set, the circuit board 926 including the power supply circuit, the video circuit, the tuned circuit (tuner), and the timing circuit for the liquid crystal display panel 900 is stored in a compact manner. With this, a space is unnecessary between the back cabinet 910 and the substrate 938 on which the light emitting diodes 942 are mounted or the radiator plate 940.

Next, manufacturing steps of the liquid crystal television set are described with reference to FIG. 10. A wall-mount bracket 948 is attached to the back cabinet 910 from the inner side thereof, the back cabinet 910 being formed by subjecting a member made of an iron material to coating. The wall-mount bracket 948 reinforces the strength of the back cabinet 910. Screw receiving holes are formed in the wall-mount bracket 948, which are used when the liquid crystal television set is mounted on the wall from the rear side of the back cabinet 910. The radiator plate 940 is fixed to the inner side of the back cabinet 910, the radiator plate 940 being made of an aluminum material.

Next, the substrate 938 on which the light emitting diodes 942 are mounted is attached to the radiator plate 940. On each of the light emitting diodes 942, the acrylic lens 944 for wide light distribution is capped, and the lens 944 is fixed by an adhesive. Depending on the brightness specification of the liquid crystal television set, when there is a margin in the junction temperature of the light emitting diode 942, the substrate 938 may be directly attached to the back cabinet 910. Here, a white resist is applied onto the substrate 938 so that light emitted from the light emitting diodes 942 can easily perform successive reflection on the surface of the substrate 938.

Next, the reflection sheet 930 is attached, which has a surface with light diffusion property, is curved in the vertical direction of the screen, and has holes larger in diameter than the lens 944 so as to insert the lenses 944 therethrough. Above the reflection sheet 930, the diffusion plate 946, a prism sheet 950, and a diffusion sheet 952, each having a thickness of 1.5 mm to 3 mm, are disposed. In the space (inner thickness Zd) between the substrate 938 and the rear surface of the diffusion plate 946, direct light from the light emitting diodes 942 and reflected light, which is secondary light, from the reflection sheet 930 are combined.

Next, the optical sheet group is fixed by the mold frame 904, which is made of a resin material and divided in quarters. Above the mold frame 904, the liquid crystal display panel 900 is disposed. The liquid crystal display panel 900 includes two glass substrates and liquid crystal sealed therebetween. One substrate (TFT substrate) includes thin film transistors (TFTs), drain signal lines, and gate signal lines, and the other substrate includes a color filter. The gate signal lines and the drain signal lines formed on the TFT substrate are pulled outside to be connected to a driver IC and a drain substrate on which the driver IC is mounted. On each surface of the glass substrates, a polarizing plate is adhered. The drain substrate is electrically connected to the timing control circuit for supplying the video signal via a flexible cable. Above the liquid crystal display panel 900, the upper frame 902 made of iron is attached, for blocking electromagnetic waves from the driver IC and fixing the liquid crystal display panel 900.

In order to finally complete the liquid crystal television set, the front cabinet 908 made of a resin material is attached to the surface of the upper frame 902. On the lower side of the cabinet 912, a control circuit for the light emitting diodes 942, a timing control circuit, a power supply circuit for supplying power to the video circuit, a connection terminal to the outside, and the like are disposed, and the cover 922 for protection, which is made of a resin, is attached.

The present invention is not limited to the embodiments described above, and various modifications may be made thereto. For example, the structures described in the embodiments may be replaced by substantially the same structure, a structure having the same action and effect, and a structure which may achieve the same object.

What is claimed is:

1. A liquid crystal display device, comprising:
   a liquid crystal display panel; and
   a backlight unit, wherein:
   the backlight unit comprises:
      a plurality of light emitting diodes each having an anode and a cathode;
      a first substrate; and
      a second substrate,
      the plurality of light emitting diodes being mounted on the first substrate and the second substrate;
   the first substrate and the second substrate are disposed adjacent to each other; and
   a first light emitting diode of the plurality of light emitting diodes mounted on the first substrate and a second light emitting diode of the plurality of light emitting diodes mounted on the second substrate which are adjacent across a boundary between the first substrate and the second substrate are disposed so that respective anodes of the first and second light emitting diodes are opposed to each other and have a pitch equal to or smaller than a pitch of other light emitting diodes of the plurality of light emitting diodes mounted on the first and second substrates.

2. The liquid crystal display device according to claim 1, wherein:
   light emitting diodes, which are mounted on the first substrate, of the plurality of light emitting diodes are all arranged so that the cathodes thereof face a side opposite to the second substrate; and
   light emitting diodes, which are mounted on the second substrate, of the plurality of light emitting diodes are all arranged so that the cathodes thereof face a side opposite to the first substrate.

3. The liquid crystal display device according to claim 2, wherein:
   the light emitting diodes mounted on the first substrate are arranged in a direction separating from the second substrate and are electrically connected in series; and the light emitting diodes mounted on the second substrate are arranged in a direction separating from the first substrate and are electrically connected in series.

4. The liquid crystal display device according to claim 3, further comprising:

a first connector, which is mounted at an end portion of the first substrate on a side opposite to the second substrate;

first cathode wiring, which electrically connects the first connector and the cathode of the light emitting diode which is farthest from the second substrate among the light emitting diodes electrically connected in series on the first substrate;

first anode wiring, which electrically connects the first connector and the anode of the light emitting diode which is closest to the second substrate among the light emitting diodes electrically connected in series on the first substrate;

a second connector, which is mounted at an end portion of the second substrate on a side opposite to the first substrate;

second cathode wiring, which electrically connects the second connector and the cathode of the light emitting diode which is farthest from the first substrate among the light emitting diodes electrically connected in series on the second substrate; and second anode wiring, which electrically connects the second connector and the anode of the light emitting diode which is closest to the first substrate among the light emitting diodes electrically connected in series on the second substrate.

5. The liquid crystal display device according to claim 4, wherein:

the plurality of light emitting diodes are respectively arranged on the first substrate and the second substrate in a plurality of rows;

the first anode wiring is disposed so as to pass between the plurality of light emitting diodes arranged in the plurality of rows on the first substrate; and the second anode wiring is disposed so as to pass between the plurality of light emitting diodes arranged in the plurality of rows on the second substrate.

* * * * *